United States Patent
Müller et al.

(10) Patent No.: US 9,776,828 B2
(45) Date of Patent: Oct. 3, 2017

(54) DEVICE FOR THE POSITION DETECTION OF AN ELEVATOR CAR AND METHOD FOR OPERATING AN ELEVATOR SYSTEM

(71) Applicant: ELGO ELECTRONIC GMBH & CO. KG, Rielasingen (DE)

(72) Inventors: Frank Müller, Dortmund (DE); Heiko Essinger, Rielasingen (DE)

(73) Assignee: Elgo Electronic GmbH & Co. KG, Rielasingen (DE)

( * ) Notice: Subject to any disclaimer, the term of this patent is extended or adjusted under 35 U.S.C. 154(b) by 669 days.

(21) Appl. No.: 14/352,205

(22) PCT Filed: Oct. 18, 2012

(86) PCT No.: PCT/EP2012/070696
§ 371 (c)(1),
(2) Date: Jul. 30, 2014

(87) PCT Pub. No.: WO2013/057215
PCT Pub. Date: Apr. 25, 2013

(65) Prior Publication Data
US 2014/0353090 A1  Dec. 4, 2014

(30) Foreign Application Priority Data
Oct. 18, 2011 (DE) .................. 10 2011 054 590

(51) Int. Cl.
*B66B 1/34* (2006.01)
*B66B 5/00* (2006.01)
(Continued)

(52) U.S. Cl.
CPC .............. *B66B 5/0068* (2013.01); *B66B 1/24* (2013.01); *B66B 1/3492* (2013.01); *B66B 5/02* (2013.01); *G01B 21/16* (2013.01)

(58) Field of Classification Search
CPC ....... B66B 5/0068; B66B 1/24; B66B 1/3492; B66B 5/02; G01B 21/16
(Continued)

(56) References Cited

U.S. PATENT DOCUMENTS 4,367,810 A * 1/1983 Doane ................ B66B 13/18
187/280
5,159,162 A * 10/1992 Tatino ................ B66B 1/44
187/280
(Continued)

FOREIGN PATENT DOCUMENTS

CN 101678996 A 3/2010
DE 102009054337 A1 6/2011
(Continued)

OTHER PUBLICATIONS

Chinese Office Action for Chinese Application No. 201280061215.3 dated Mar. 26, 2015.

*Primary Examiner* — Anthony Salata
(74) *Attorney, Agent, or Firm* — Bachman & LaPointe, PC

(57) ABSTRACT

A device for detecting the position of an elevator car (40) by a sensor and evaluation unit (20, 22, 24), accommodated in a sensor housing (10), which can be arranged on the elevator car, is designed for interaction with a strip (14) having a length and/or position coding and which is connected to a switching unit (12) that has a safety switch (30) and/or an interrupter contact for an emergency function, especially an emergency stop of the elevator car, the sensor and evaluation unit being designed for generating a position and/or speed signal from the length or position coding and for generating or receiving an elevator car status signal (62) that corresponds to an opening status of an elevator car. A monitoring device (60) for activating the switching unit is associated with the sensor and evaluation unit and is designed such that
(Continued)

the emergency function can be activated as a response to the position or speed signal and to the elevator car status signal if a car movement with the elevator car door open exceeds a predetermined speed threshold value and/or acceleration threshold value and/or displacement threshold value.

10 Claims, 2 Drawing Sheets

(51) Int. Cl.
 *B66B 1/24* (2006.01)
 *B66B 5/02* (2006.01)
 *G01B 21/16* (2006.01)

(58) Field of Classification Search
 USPC ....... 187/247, 277, 391, 393, 394, 288, 289, 187/316
 See application file for complete search history.

(56) References Cited

U.S. PATENT DOCUMENTS

| | | | | |
|---|---|---|---|---|
| 5,821,477 A * | 10/1998 | Gerstenkorn | ......... | B66B 1/3492 187/316 |
| 5,880,417 A | 3/1999 | Koh | | |
| 6,854,565 B2 * | 2/2005 | Perala | ................... | B66B 5/0006 187/247 |
| 7,201,256 B2 * | 4/2007 | Deplazes | .............. | B66B 5/0043 187/279 |
| 7,775,330 B2 * | 8/2010 | Kattainen | ................. | B66B 5/04 187/287 |
| 7,886,877 B2 * | 2/2011 | Ueda | ...................... | B66B 13/20 187/316 |
| 7,891,467 B2 * | 2/2011 | Kattainen | ............. | B66B 5/0056 187/316 |
| 7,946,393 B2 | 5/2011 | Thumm | | |
| 8,162,108 B2 * | 4/2012 | Sirigu | ................... | B66B 5/0068 187/289 |
| 8,365,873 B2 * | 2/2013 | Viita-Aho | ............. | B66B 5/0031 187/314 |
| 8,820,482 B2 * | 9/2014 | De Coi | ................. | B66B 5/0031 187/247 |
| 8,869,945 B2 * | 10/2014 | Harkonen | ................. | B66B 1/28 187/288 |
| 2009/0277724 A1 | 11/2009 | Thumm et al. | | |
| 2012/0073909 A1 | 3/2012 | Kondo et al. | | |
| 2015/0008076 A1 * | 1/2015 | Muller | ................... | G01B 7/003 187/394 |

FOREIGN PATENT DOCUMENTS

| | | |
|---|---|---|
| EP | 1679279 A1 | 7/2006 |
| EP | 2165960 A1 | 3/2010 |
| GB | 2201656 A | 9/1988 |
| WO | 2010150341 A1 | 12/2010 |

* cited by examiner

DEVICE FOR THE POSITION DETECTION OF AN ELEVATOR CAR AND METHOD FOR OPERATING AN ELEVATOR SYSTEM

BACKGROUND OF THE INVENTION

The present invention relates to a device for detecting the position of an elevator car. The present invention further relates to a method for operating an elevator system exhibiting an elevator car.

Generally known from prior art are generic devices, wherein in particular generic strips typically extending along an elevator shaft, and hence along the traveling direction of the elevator car, are also generally known as carriers for a magnetic coding used for determining the position and/or speed of the elevator car. For example, DE 10 2009 054 337 A1 of the Applicant depicts a generic device in which the carriage-like sensor housing that can move along the strip exhibits the sensor and evaluator unit in the form of suitable magnetic field sensors as well as allocated decoding and evaluator electronics, and makes the electronic signal generated in this way available to other downstream control units.

In particular in conjunction with safety-relevant elevator technology, it is both known and common to allocate such a generic sensor and evaluator unit to a respective elevator car (for passengers or freight) in the outer region of the car. During elevator operation, the (relatively or absolutely provided) magnetic coding on the strips stationary relative to the sensor housing are continuously scanned to generate the respective data, making it possible to determine the position, and from that derive the speed of the elevator car.

Emergency systems of an elevator system must also be presumed as prior art. A typical emergency system of this kind provides that a critical operational and movement state of the elevator car, such as when a speed threshold (possibly depending on a current position) is exceeded, automatically trigger safety measures, for example initiate a braking function for the elevator motor or activate a parachute brake for the elevator car.

Because special importance is here attached to detection reliability, the sensor and evaluator units are usually redundant, i.e., designed as two functional units, which are essentially provided and operated parallel to and independently of each other. The latter can each activate the emergency function in response to reaching a speed threshold, for example.

Despite the described and presumed generically known technology for detecting the speed and position of an elevator car relative to a (stationary and typically magnetized or otherwise coded) strip, it still continues to be common practice in elevator systems technology to safeguard functionalities relevant to safety by means of mechanical switches or similar aggregates. One such case involves setting up so-called safety or cutout positions for an elevator car in a shaft during maintenance operations: If a maintenance technician is on the floor of the elevator shaft during such maintenance operations, a suitable (key) switch is typically operated to activate a mechanical, stationary limit switch that can be actuated via the elevator car, and is positioned in the shaft in such a way as to stop an elevator car moving down via an emergency shutdown, once the latter (upon reaching the switch) threatens to reach or drop below the free minimum height in the shaft as a safety distance for the person. However, such mechanical limit switches require a lot of maintenance and pose a potential risk of malfunctions or the like, with the associated risk to maintenance personnel. Such minimum safety distances are here used both in a lower (floor) elevator shaft region and in an upper shaft region (then as a free area between an elevator car ceiling and an upper shaft end); the safety distances are here also traditionally maintained by stationary mechanical switches provided on the shaft.

Another potential way to achieve safety-relevant optimization in realizing and operating elevator systems involves providing protection against malfunctions (and hence possible endangerment of elevator car passengers) at respective stopping positions along the shaft: These stopping positions typically correspond to the respective floors, so that the passengers can enter or exit the elevator car when the elevator car door is open. The elevator car is here held at the respectively provided position by corresponding braking means. However, inadvertent movements by the elevator car with the car stopped and door open can at the same time result in dangerous situations, for example if the drive and/or brake defects cause the car to not be held precisely in the vertical position or to inadvertently move.

Therefore, the object of the present invention is to improve a generic device for detecting the position of an elevator car in terms of drive and maintenance reliability of an elevator system realized therewith, in particular to ensure additional safety during elevator operation with the car stopped (and car door open), and/or enhance the safety for individuals involved in maintenance in the elevator shaft during maintenance operations for an elevator system. In this case, in particular an equipment or hardware outlay must be minimized, the potentially hazardous traditional mechanical sensors or switches must be minimized, and the ability to monitor such devices must generally be improved.

SUMMARY OF THE INVENTION

This object is achieved by the device for detecting the position of an elevator car. The object is further achieved with the method for operating an elevator system wherein these methods can also relate to operating a position detecting device. Advantageous further developments of the invention are described hereinbelow.

It is initially advantageously achieved that the generically offered or generated position and/or speed signal (generated by scanning and subsequently evaluating the preferably magnetic coding provided on the strip, wherein this coding can alternatively also be optically or mechanically scanned) can be used to effect the further safety-relevant monitoring of the safety stop position(s) in the shaft and/or monitor for an incorrect movement (i.e., one exceeding the corresponding thresholds) by the elevator car while it is stopped with the elevator door open. In other words, the present invention offers a surprisingly simple and efficient way to achieve additional safety (e.g., an essentially more operationally reliable and lower maintenance alternative to traditional switching sensors) by evaluating in more detail a position or speed signal that is already present as an unconditioned signal anyway.

As a result, it becomes possible in the first claim to detect variables for the elevator car of relevance to movement, specifically including a speed of a moving elevator, the acceleration of an elevator car and/or a displacement of the elevator car (e.g., relative to a predetermined period and/or an amplitude range in the case of an oscillation), compare these variables to corresponding standard sizes as thresholds, and thereby arrive at conclusions about any potential malfunctions in a timely and highly reliable manner, without needing any additional mechanical sensors. Within the framework of the already present safety functionality, this can then lead to the triggering of corresponding emergency measures, such as an emergency stop.

The technical infrastructure likewise makes it possible to define the safety stop position(s), either at one end (e.g., in the shaft floor), or at both ends of the guide realized via the strip (taking into account the respective length margin required for the safety space or safety distance). It is precisely here where a stationary, maintenance-intensive and potentially error-prone limit switch is no longer required at the respective positions, making it possible not just to reduce equipment outlay, but also to significantly increase operational safety.

In the advancement according to the invention, in which these respective inventive aspects can also be correlated and thus further develop each other, the sensor and evaluator unit then additionally make it possible to generate an elevator door release signal: Because the position signal (as compared to suitably prescribed comparison signals, e.g., those corresponding to floor positions) enables the allocation of precisely one current elevator car position to such an entry, generating the elevator door release signal per the advancement is what even permits the operation to open the car door in response to this release signal in the first place, so that operational safety can be additionally enhanced. In particular, the monitoring unit according to the further development receives this elevator door release signal, and makes its operation dependant on this additional detection in this regard.

In the practical advancement of the invention, it can here once again be expedient and useful to provide manually or mechanically actuatable switches or mode selection units, for example to activate maintenance operations according to the invention along with the functionality thereby provided. To this extent, the maintenance technician would have to perform such an activation (potentially secured with additional safeguards) before entering the elevator shaft.

While the present invention basically provides the aggregates claimed according to the invention as a "device for determining the position of an elevator car" even independently of a specific car or system context (i.e., as a suitable arrangement comprised of sensor and electronic components), the present invention is also not limited thereto. The methods according to the invention also involve the operation of an elevator system, and also an elevator system (with accompanying elevator car) as a system and context, and disclosed as belonging to the invention alternatively to the wording to the claim.

BRIEF DESCRIPTION OF THE DRAWINGS

Additional advantages, features and details of the invention may be gleaned from the following description of preferred exemplary embodiments and based on the drawings; the latter show FIG. 1 a diagrammatized block diagram for illustrating essential functional components of the present invention, integrated into a common exemplary embodiment, and FIG. 2 a diagrammatic view of an elevator system for illustrating the background and application context of the present invention.

DETAILED DESCRIPTION

Figure 2:
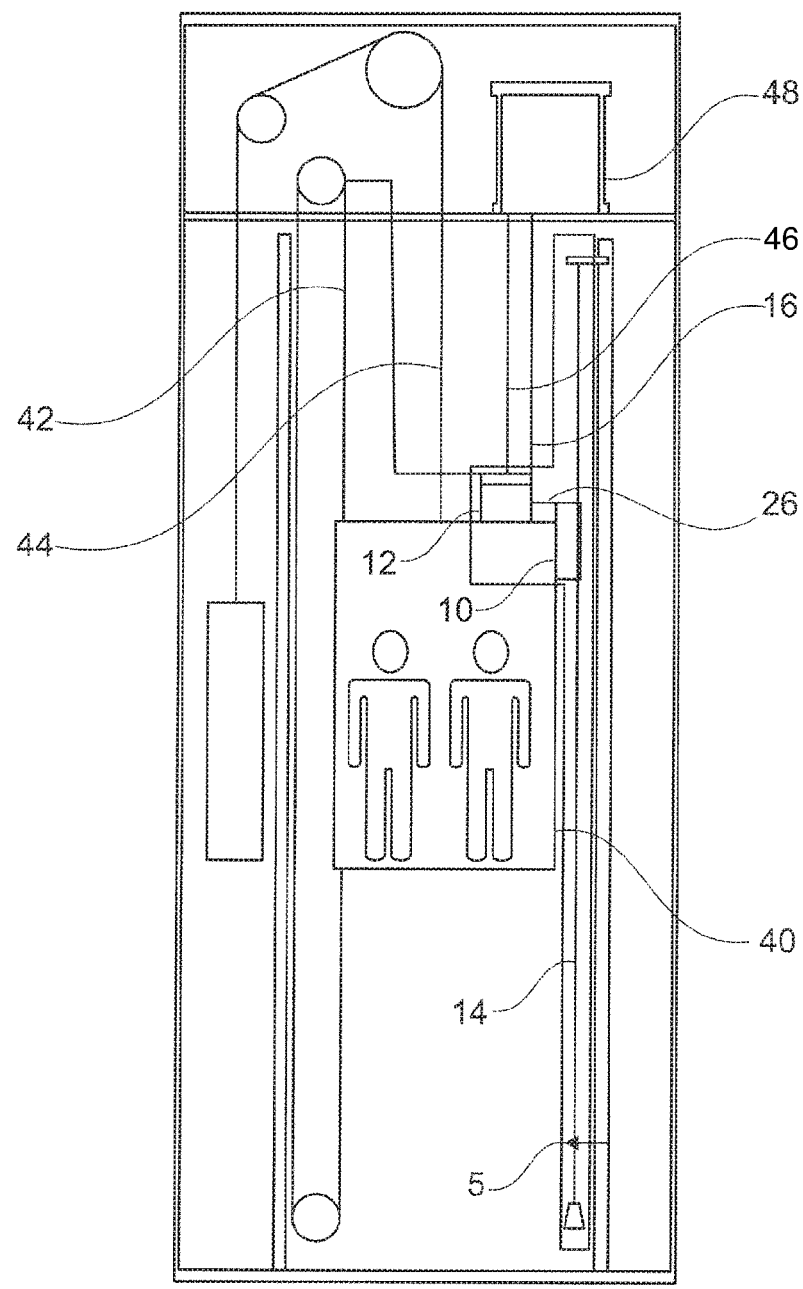

The diagrammatic view on FIG. 2 presents an elevator system with an elevator car 40, which as depicted schematically can be moved on a drive unit 42, 44 in a vertical direction in the elevator shaft.

A position detection device rests on the elevator car 40, and consists of a sensor housing 10 along with a switch housing 12 connected thereto via a cable link 26. This switch housing 12 is connected by a line arrangement 46 with an elevator control unit 48 resting in the front region of the elevator shaft, from where a wide variety of operating states of the depicted elevator system are controlled, and any required emergency measures (such as an emergency stop) are initiated.

The sensor housing 10 that exhibits a sensor and evaluator unit for detecting a position and determining the elevator speed from the latter is aligned with a fixed magnetic tape 14, which is vertically braced with clamping devices 5, and extends quasi-stationary in a vertical direction in the elevator shaft.

In an otherwise known manner, for example as described in DE 10 2009 054 337 A1 of the Applicant, the sensor and evaluator unit in the sensor housing 10 exhibit an array of magnetic sensors, which read out a permanent magnetic absolute coding of the magnetic tape and convert it into position information; a position signal that has been altered (by moving the elevator car) also provides a basis for detecting the speed (and hence a speed signal) of the car.

Hooked up to the sensor housing 10 via the cable 26, the switch housing 12 initially establishes the connection to the elevator control unit 48. In addition, the switch housing 12 incorporates various safety-relevant units, in particular a switching unit that can be activated for an emergency function. This switching unit typically consists of a relay 30, which responds to an activation by triggering a braking operation (by a motor brake of the elevator drive 42, 44 or alternatively a parachute brake suitably provided in the elevator shaft but not shown), thereby ensuring that the elevator car stops.

Figure 1:
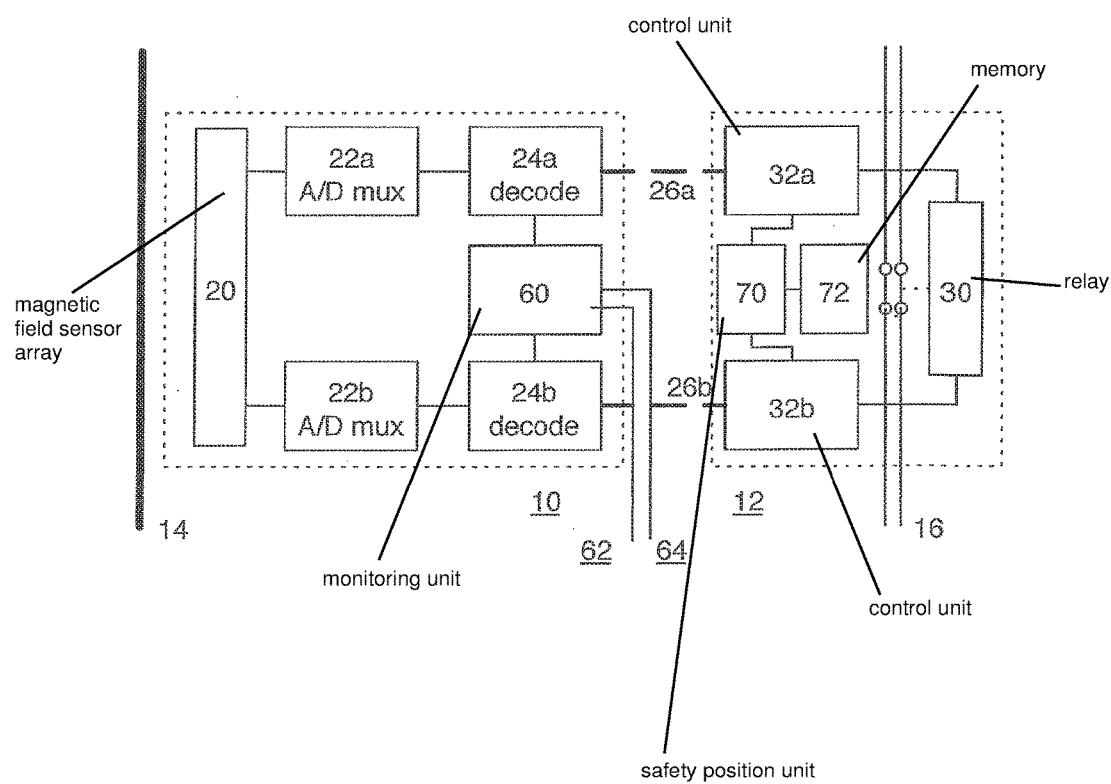

The block diagram on FIG. 1 illustrates in detail the functionally essential components, which can be practically realized in an otherwise known manner with respective sensor and electronic components. The sensor housing 10 contains the sensor and evaluator unit in a redundant configuration: A schematically depicted magnetic field sensor array 20 (e.g., see the mentioned DE 10 2009 054 337 A1 for further explanation) in the form of two parallel branches set up independently of each other (a/b) is initially amplified, A/D converted and changed into a multiplex signal (units 22a, 22b), whereupon actual decoding then takes place in units 24a, 24b, including a fine positioning by extrapolating the detected permanent magnet signals (in an otherwise known manner). These functionalities for units 22, 24 (for respective branches a, b) are realized in the form of typical, microcontroller-based switch configurations, which are suitably programmed for this purpose.

Units 24a, 24b are also connected with a schematically depicted monitoring unit 60 (once again suitably realized by means of a programmed microcontroller unit, if necessary also within the framework of the same units already present anyway), which on the one hand receives an elevator door opening signal symbolized by line 62, and on the other hand itself provides an elevator door release signal to the control unit 48 via the schematically depicted line 64.

Reference numbers 26a, 26b of the cable connection 26 illustrate how the redundant sensor and evaluator unit 22, 24 in the sensor housing 10 communicate over two channels with the switch housing 12, which initially exhibits the relay arrangement 30 with the depicted safety function, which can be triggered by both branches. In particular interrupting the accompanying line 16 causes the described safety function(s) to be triggered, e.g., a motor and/or parachute brake for the elevator car.

In the exemplary embodiment on FIG. 1, this control functionality is realized by a once again paired (a/b) control unit 32, which is provided in the switch housing 12. Also accommodated inside the housing 12 so as to communicate with the control unit 32*a*, 32*b* is a safety position unit 70, which receives current elevator position information (redundantly) via the branches 22-24-26-32, and compares them with desired values stored in the memory unit 72 (shown symbolically connected). Such desired values can be safety distances, which in a (suitably activatable) maintenance mode (not shown) prescribe the safety position(s) that the elevator car must observe below and/or above in the elevator shaft to protect a maintenance technician who potentially might be there.

During operation, the device schematically depicted on FIG. 1 and built up in the system on FIG. 2 makes it possible to use the monitoring unit 60 to initially determine a stop position of the elevator car as well as a door opening status of the elevator door, and in this state to monitor a movement by the elevator car by evaluating the position and/or speed signals. If a prescribed threshold (suitably provided, programmed or configured in the unit 60) is exceeded, the emergency stop could then be triggered (via relay 30). To this end, the unit 60 processes not just the (redundantly introduced) decoded position or speed signal of the units 24*a*, 24*b*; information about the open status of the elevator door is also present in the form of the entry 62. The unit 60 advantageously also is what even permits the line 64 to release the elevator door to open at all, specifically when the position signal received by the units 24*a*, 24*b* (e.g., by comparison with suitably provided stored values corresponding to floor positions) shows that the car is in a position suitable for opening the door.

In the exemplary embodiment shown, the unit 70 in combination with this functionality advantageously allows for predetermined safety stop positions differing from continuous elevator operation to be determined, monitored and taken as the basis for shutting down or stopping the elevator car when reached or exceeded during a suitably prescribed or established maintenance operation (e.g., activatable by a key switch that is not shown). No separate (e.g., mechanical) switch or sensor technology in the elevator shaft is here required.

The present invention is not limited to the described exemplary embodiment. As a further development or alternative, for example, only one of the units 60 or 70 can be provided for realizing the invention, and these units can be also be provided solely within the framework of the sensor housing 10, so that the switch housing 12 can be a strictly passive housing with a relay 30, and all electronic evaluation takes place exclusively in the housing 10.

The invention claimed is:

1. A device for detecting the position of an elevator car and for operating the elevator car in a normal mode and a maintenance mode, comprising: a sensor and evaluator unit provided on the elevator car to interact with a strip exhibiting a length and/or position coding, wherein the sensor and evaluator unit is incorporated in a sensor housing, and is connected with a switching unit having a safety switch and/or interrupter contact for an emergency function, wherein the sensor and evaluator unit is designed to generate a position and/or speed signal from the length or position coding, and to generate or receive an elevator car door status signal corresponding to the opening state of an elevator car door, the sensor and evaluator unit has allocated to it monitoring means for activating the switching unit that are designed in such a way that, in the normal mode of operation, the emergency function can be activated in response to the position or speed signal and to the elevator car door status signal if a car movement exceeds (1) a predetermined speed threshold and/or acceleration threshold and/or (2) displacement threshold with the elevator car door open, and in the maintenance mode of operation the emergency function is triggered by movement of the elevator car past a stored safety position.

2. The device according to claim 1, wherein the sensor and evaluator unit is designed to additionally generate an elevator car door release signal from the position signal, wherein the control means allocatable to the elevator car door can activate an operation to open the elevator car door in response to the elevator car door release signal.

3. The device according to claim 1, wherein the monitoring unit is designed in such a way that the switching unit is activated as a function of the elevator car door release signal.

4. A device for detecting the position of an elevator car comprising: a sensor and evaluator unit provided on the elevator car and for operating the elevator car in a normal mode and a maintenance mode, which interacts with a strip exhibiting a length and/or position coding, wherein the sensor and elevator unit is incorporated in a sensor housing, and is connected with a switching unit having a safety switch and/or interrupter contact for an emergency function, wherein the sensor and evaluator unit is designed to generate a position signal from the length or position coding, the sensor and evaluator unit exhibits a safety position unit which compares the position signal with a predetermined stored position value during the maintenance operation in such a way as to trigger the switching unit for an emergency stop as an emergency function in response to reaching or exceeding a traveling position of the elevator car corresponding to the predetermined position value, and wherein the sensor and evaluator unit generates or receives an elevator car door status signal corresponding to the opening state of an elevator car door and, during the normal mode of operation, triggers the emergency function when car movement exceeds a displacement threshold with the elevator car door open.

5. The device according to claim 4, wherein the predetermined position value corresponds to a traveling position of the elevator car provided at both ends, spaced apart from the strip end and/or a shaft end of the elevator car by a distance equal to the working height of a maintenance technician.

6. The device according to claim 4, wherein the safety position unit interacts with an activatable switching or operating mode selection means, which can be actuated for initiating maintenance operations.

7. The device according to claim 4, wherein the sensor and evaluator unit interacts with the strip carrying an absolute coding and to determine position and/or speed information from the latter.

8. The device according to claim 7, wherein the sensor and evaluator unit is redundantly provided with a pair of electronic control units that determine the position and/or speed of the elevator car independently of each other.

9. The device according to claim 8, wherein the sensor housing comprises a measuring carriage unit designed to travel along the strip, the measuring carriage unit is coupled to a neighboring switching unit by a connecting cable.

10. A method for operating an elevator system having an elevator car, and a device according to claim 4, comprising the following steps:
- (a) detecting an elevator door opening status of the elevator car;
- (b) acquiring a motion speed, an acceleration and/or a displacement of the elevator car with the elevator door in an open state by scanning and evaluating a length and/or position coding provided along the strip allocated to the elevator car;
- (c) triggering an emergency function of the elevator car if the motion speed, acceleration and/or displacement exceeds a predetermined threshold;
- (d) activating a maintenance mode for the elevator system;
- (e) comparing a position signal obtained by evaluating a position coding provided along the strip with at least one position value corresponding to a safety stop position in the elevator system; and
- (f) triggering an emergency stop as an emergency function of the elevator car if the elevator car reaches or exceeds the safety stop position along the strip.

\* \* \* \* \*